2,924,820

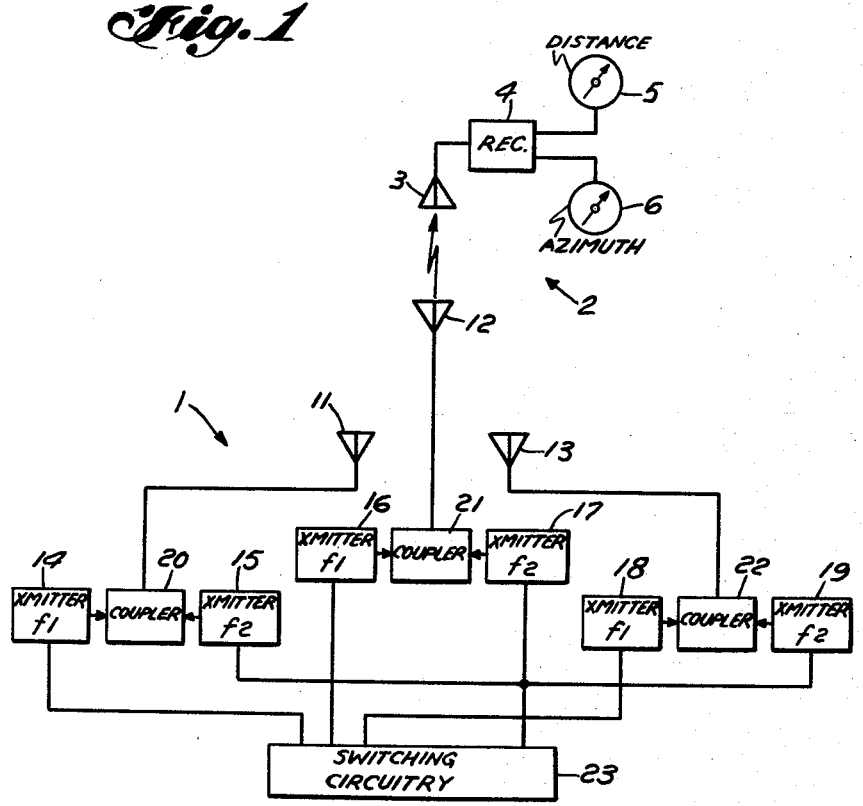
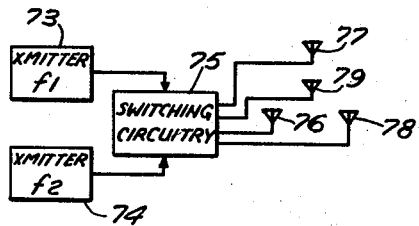

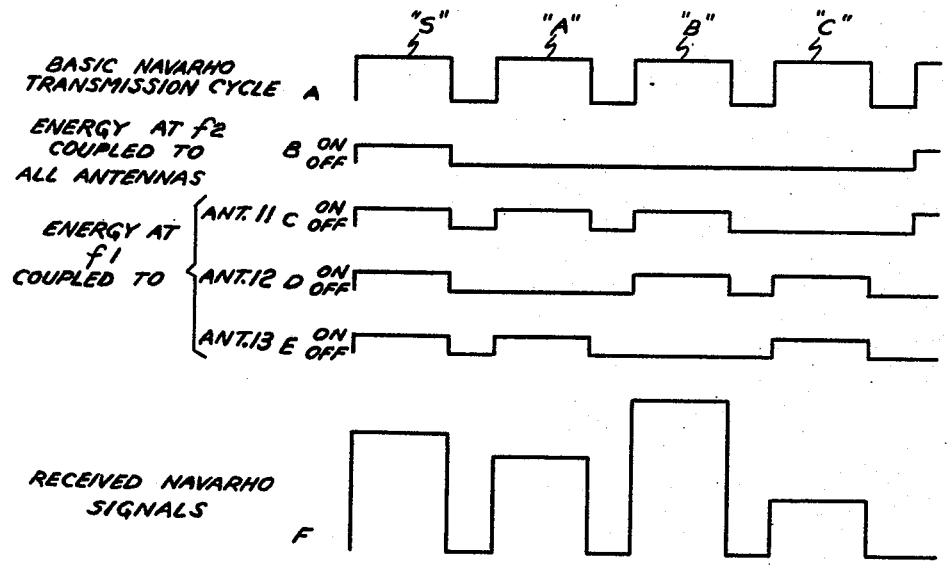
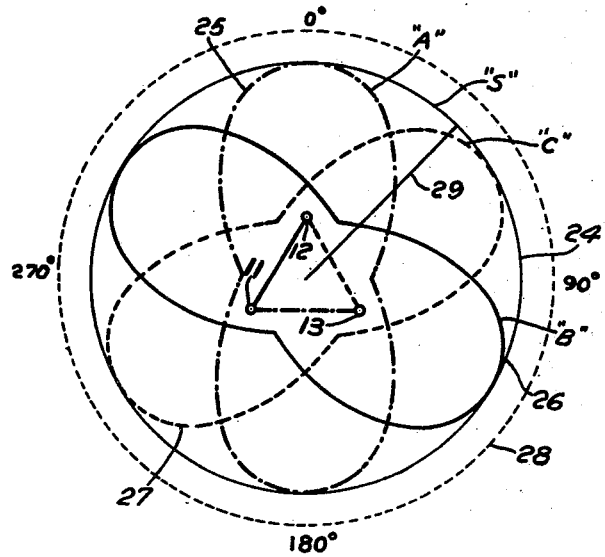

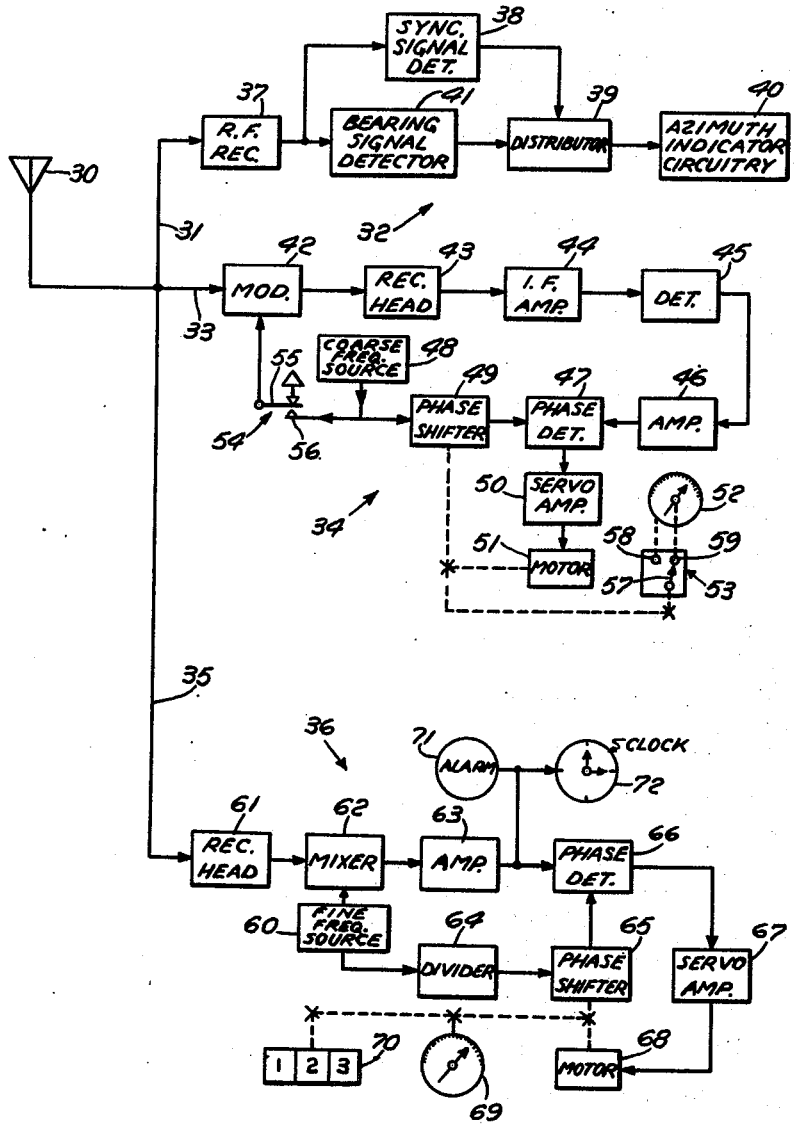

AERIAL NAVIGATION BEACON SYSTEM

Milton Dishal and Mortimer Rogoff, Nutley, N.J., assignors to International Telephone and Telegraph Corporation, Nutley, N.J., a corporation of Maryland Application February 28, 1955, Serial No. 491,082

10 Claims. (Cl. 343—102)

This invention relates to long range radio navigation systems and more particularly to long range radio navigation systems of the general type which yield azimuth and distance information to a mobile craft from a ground beacon site.

For long range navigation, particularly for guiding aircraft over routes crossing oceans, it is desirable that radio beacon systems be provided which are reliable in operation so that scheduled travel may be maintained substantially all of the time. Due to long stretches of ocean between land bases, it is essential that the beacon transmissions of such systems have a range in the order of 1500 miles or more. For the usual type of radio range beacons, operable over short or intermediate distances, it has generally been considered more suitable to use relatively short waves. It has been proposed, however, that for reliability over long distances long range navigation radio beacon systems be provided operating at relatively low frequencies and with relatively narrow bandwidths. Such a type of radio beacon system has been disclosed by way of example in U.S. Patent No. 2,524,765 issued to Henri G. Busignies and Paul R. Adams on October 10, 1950, entitled "Radio Beacon," and in U.S. Patent No. 2,510,065 issued to H. G. Busignies, P. R. Adams and R. I. Colin on June 5, 1950, entitled "Beacon System." In this general type of system it has been shown that very high reliability with reasonable power consumption could be expected if the system operated in a low frequency region, for example, around 100 kilocycles and utilized extremely narrow frequency bandwidths. In such systems as described in the above-identified patents the beacon transmissions were not completely omnidirectional, and manual adjustment of the attenuations were necessary in order to properly read the indication obtained from such beacons. A further improvement over such radio beacon systems was disclosed in U.S. Patent No. 2,541,040 issued to R. I. Colin February 13, 1951, entitled "Radio Range Beacon." In this last identified patent a radio navigation system, now known as "Navaglobe," was provided which consisted essentially of three transmitting antennas arranged in an equilateral triangle and which were successively energized in pairs so that different directional distribution of energies were produced in different angular sectors omnidirectionally about the beacon. Although extremely accurate azimuth indications were obtainable by using the Navaglobe signals, for relatively coarse indications, with an accuracy of 1° or 2°, the three transmitting antennas were spaced less than a half wavelength apart and successively energized cophasally in pairs with one of the antennas being energized to produce an omnidirectional pattern at the beginning of each cycle to function as a synchronizing signal. When the signals were received aboard a mobile craft the synchronizing signals served to control the distribution of the other received energies at the receiver so that the successively received energies or bearing signals were applied to different windings of a three coil ratiometer arrangement. The ratiometer needle then assumed a position dependent upon the resultant field in the three coils.

The concept of the Navaglobe system above described has found wide acceptance. However, certain disadvantages have occurred due to the use of the three coil ratiometer indicator arrangement. In a U.S. patent application of P. R. Adams, B. Alexander and R. I. Colin, Serial No. 759,513, filed September 8, 1958, a continuation in part of Serial No. 382,934, filed September 29, 1953, now abandoned, entitled "Aerial Navigation Indicator" and assigned to the same assignee as this application, an improvement of the Navaglobe aerial navigation beacon system has been disclosed in which the indicator of the ratiometer type was replaced by the mathematically equivalent but a practically superior indicator of the resolver type, and the transmission cycle was modified so that a synchronizing gap or interval was provided instead of the synchronizing signal. As a result, the cophasal energy from each pair of antennas after detection in the airborne receiver was coupled from the receiver's intermediate frequency output to designated stator inductors under the control of the synchronizing signal responsive to the detection of the synchronizing gap or interval. In the rotor or pickup coil of the resolver, the individual voltages were successively induced responsive to the strengths of the emitted signals and also dependent upon the angular position of the rotor coil. An integration type square law detector measured the algebraic sum of the reduced voltages over an integral number of transmission cycles, and its output served as an error signal which could control a servo mechanism to automatically move the rotor coil to an angle at which there was a null output from the integrating detector. This angle, being dependent upon the strength ratio of the original signals emitted by the antenna pairs, was equivalent to the bearing of the transmitter array from the receiver.

In order to be a complete position determining system, the Navaglobe air navigation beacon system which yielded purely azimuth information required that a given craft always be within range of two or more beacons so that a bearing from the craft to each of the beacons would, through a process of triangulation, be determinative of the aircraft's position. It has been recognized that an ideal system for position fixing is one which could provide in combination distance and bearing indications from a single ground station to a mobile craft similar to the service provided by certain very or ultra high frequency medium and short range navigation systems operating primarily over land routes. A single navigation beacon providing merely distance indications has the same practical drawback that a beacon providing merely azimuth indications has. However, we have recognized that by combining the advantages of the long range bearing system known as Navaglobe with means which could provide long range distance measurements a superior complete aerial navigation position fixing system is provided which has been generically termed "Navarho."

One of the objects of our invention, therefore, is to provide a long range radio navigation beacon system which is substantially omnidirectional and provides azimuth fixes and distance measurements from a properly equipped mobile craft to the transmitting beacon.

It is another object of our invention to provide a long range radio navigation system operable at low radio frequencies which enables a mobile craft to determine its position relative to a single transmitting beacon site.

It is a further object of our invention to provide a simple type of radio navigation system wherein bearing signals are transmitted in differently directed radiation patterns and amplitude comparison thereof may be obtained to yield an azimuth direction and phase comparisons of transmitted and locally generated signals may be utilized to effect a distance measurement.

It is still a further object of our invention to provide a simple and reliable radio navigation system operable over relatively long ranges at low radio frequencies wherein signals of narrow bandwidth are utilized to produce indications of angular position and distance of the receiver with respect to a single transmitting beacon.

In accordance with one of the features of this invention a radio navigation system is provided in which a transmitter having means for cyclically and successively transmitting a plurality of signals including a plurality of differently directed radiation pattern bearing signals and a synchronizing signal at a given frequency and phase, and a receiver for receiving said signals and including azimuth determining means responsive to the bearing signals and distributor means responsive to the synchronizing signals to identify the bearing signals, and a source of reference signals of said given frequency and phase, means for comparing the phase of said reference signals and said separated synchronizing signals, and means controlled by the output of said comparison means and responsive to said comparison signal for producing a distance indication.

In accordance with a further feature of our invention, an air navigation radio beacon system of the Navarho type consists essentially of three transmitting antennas placed in an equilateral triangle and which are successively energized in pairs in phase so that a different directional distribution of energy is produced in different angular sectors omnidirectionally about the beacon. The keying cycle comprises four pulsed continuous wave trains per second in which one pulse is transmitted from each pair of towers and the fourth pulse is transmitted omnidirectionally. Thus, the pulses are transmitted in a sequence in which the three pulses from the excitation of tower pairs are compared in amplitude to yield an azimuth indication from a mobile craft to the transmitting beacon site. The fourth pulse is a synchronizing pulse which is transmitted omnidirectionally to synchronize the receiving equipment for proper distribution of the different transmitted pulsed bearing signals from each antenna pair. While it is possible to use one frequency for distance measurement we prefer that during the synchronizing pulse, two radio frequencies be transmitted simultaneously, enabling the synchronizing pulse to serve a dual purpose. One of the purposes is to supply synchronizing information so that the azimuth information pulses or bearing signals transmitted by antenna pairs may be properly distributed and the second purpose is to furnish the distance (rho) information. The distance information is obtained by measuring the phase differences between the two frequencies transmitted and the phase of a highly stable frequency generated in the aircraft. The bearing information obtained from the amplitude comparison and the distance information obtained from the phase comparison can be conveniently presented to a navigator.

The above-mentioned and other features and objects of this invention will become more apparent by reference to the following description taken in conjunction with the accompanying drawings, in which:

Fig. 1 is a schematic diagram in block form of one embodiment of a Navarho beacon installation in accordance with the present invention;

Fig. 2 is a graphical representation of the modulating cycle in accordance with our invention to produce the radiation pattern shown in Fig. 3;

Fig. 3 illustrates the field pattern distribution which may be expected from successive radiations of the beacon shown in Fig. 1;

Fig. 4 is a schematic diagram in block form of an embodiment of a receiver for use in the Navarho air navigation system described herein; and, Fig. 5 is a schematic diagram in block form of an alternate embodiment of a radio beacon system in accordance with the principles of our invention.

Referring to Fig. 1 of the drawings, one embodiment of a Navarho radio navigation system in accordance with the principles of our invention is shown to comprise a ground beacon portion 1 and a mobile receiver portion 2. The receiver portion of the Navarho system includes an antenna 3 coupling energy to receiver circuitry 4. The output of the receiver circuitry 4 is coupled to distance meter 5 and azimuth meter 6 to display the navigation information in convenient form. The ground beacon 1 includes three antennas 11, 12 and 13 located at the corners of an equilateral triangle. Associated with each of the antennas 11, 12 and 13 are radio frequency sources or transmitters 14 and 15, 16 and 17, 18 and 19, respectively. As will be readily understood by those skilled in the art the transmitters 14 to 19 actually need only comprise sources of radio frequency energy such as oscillators and the paired equipment may cojointly utilize in common the same final stages such as amplifiers. Sources 14, 16 and 18 couple radio frequency energy at a frequency $f_1$ to the antennas 11, 12 and 13 through coupler units 20, 21 and 22. In addition, sources 15, 17 and 19 are capable of coupling radio frequency energy at a frequency $f_2$ through couplers 20, 21 and 22 to antennas 11, 12 and 13, respectively. Obviously the couplers 20, 21 and 22 may also represent the stages common to both sources of radio frequency energy. Switching circuitry or distributor equipment 23 is provided to cylically energize the three antennas 11, 12 and 13 cophasally in pairs from the radio frequency (R-F) sources 14, 16 and 18 operating at frequency $f_1$. Thus, antennas 11 and 12 may first be energized, then 12 and 13, and then 13 and 11. As part of this cycle, and interleaved in time with the bearing signals a synchronizing signal is transmitted omnidirectionally. The synchronizing signal may consist of a simultaneous transmission of two frequencies $f_1$ and $f_2$ and thus the switching or distributor equipment 23 causes all sources of radio frequency energy 14–19, inclusive, to simultaneously couple energy to all three antennas 11, 12 and 13, enabling an omnidirectional signal to be transmitted at $f_1$ and $f_2$. As hereinafter explained, alternate methods of transmitting an omnidirectional signal may be utilized, such as for example, a fourth antenna located centrally of the equilateral triangle formed by antennas 11, 12 and 13 and simultaneously energized by two sources of radio frequency energy operating at frequency $f_1$ and $f_2$.

Referring to Fig. 2, curves representing the basic Navarho transmission cycle are therein shown including the switching signals coupled from the distributor equipment 23 to the radio frequency sources 14, 16 and 18 in order to energize the antennas 11, 12 and 13. Curve A represents the basic Navarho transmission cycle comprising a synchronizing signal "S" followed by an "A," "B" and "C" bearing signal. The "A" bearing signal represents the time during which antennas 11 and 13 are energized from sources 14 and 18 producing a maximum energy direction of radiation in line with antenna 12 and perpendicular to a line drawn through antennas 11 and 13, and the "B" bearing signal represents the time during which antennas 11 and 12 are energized from sources 14 and 16 producing a radiation pattern having a maximum energy direction in line with antenna 13 and perpendicular to a line drawn through antennas 11 and 12 and the "C" bearing signal represents the energization of antennas 12 and 13 from sources 16 and 18 producing a maximum energy direction of radiation in line with antenna 11 and perpendicular to a line drawn through antennas 12 and 13. Curve B of Fig. 2 represents the time of coupling of the radio frequency energy at frequency $f_2$ to antennas 11, 12 and 13 to produce an omnidirectional signal during the synchronizing signal period "S." Frequency $f_1$ is also applied at this time to all of the antennas as shown by curves C, D and E which represent the periods of time during which energy at $f_1$ is coupled to antennas 11, 12 and 13, respectively, to produce the "A," "B" and "C" bearing signals.

Fig. 3 illustrates that the resultant field patterns due to the bearing signals is roughly figure-of-eight in shape and is strongest along an axis perpendicular to a line drawn between the excited pair of antennas. This figure-of-eight pattern is rotated in 120° steps by sequentially energizing the different pairs of antennas around the triangle. The switching circuitry 23 controls the energization of the antennas cyclically in four steps as heretofore explained, and with reference to Fig. 2 it is seen that all three of the antennas are energized once each cycle for a synchronizing period and radiate energy at both frequency $f_1$ and $f_2$. Antenna pairs 11, 13; 11, 12; and 12, 13 are then each successively energized by the switching circuitry 23 for periods represented by the "A," "B" and "C" bearing signals. When three antennas are energized during the synchronizing period "S" an omnidirectional radiation pattern indicated at 24 is produced. This omnidirectional signal is received by all craft within range of the beacon. When the antennas 11 and 13 are energized cophasally, the radiation pattern 25 shown in dot-dash lines is produced. Successively thereafter antennas 11 and 12 are energized producing the radiation pattern 26 shown in solid lines and antennas 12 and 13 are energized producing radiation patterns 27 shown in dotted lines. Thus, it is seen as indicated by scale 28 that a difference in amplitude of energy at frequency $f_1$ from patterns 25, 26 and 27 is produced omnidirectionally about the beacon at any given azimuth from the beacon, the ratios of the field strengths of the three figure-of-eight radiation patterns determine the azimuth. The bearing signals received at an azimuth of approximately 40° is shown in Fig. 2, curve F, and is schematically illustrated in Fig. 3 by line 29. Obviously a 180° ambiguity exists which can be readily resolved by ascertaining the general geographic position of the craft or it may be resolved by direction finding on two or more beacons or other radiation points to generally locate the position of the mobile craft.

The operation of the radio navigation system shown in Fig. 1 may be more clearly understood in relation to the description of one embodiment of a receiver system for use in cooperation therewith. The receiver is most readily understood in connection with a description of Fig. 4 which illustrates schematically in block form one embodiment of a receiver system for use in the Navarho navigation system. The receiver equipment may be carried on any mobile craft or disposed at any other location at which it is desired to determine the position relative to the beacon transmitter shown in Fig. 1.

The receiver portion for use in cooperation with the aerial navigation beacon shown in Fig. 1 is best described by referring to its three functions, i.e., the determination of azimuth from the mobile craft to the beacon and the coarse and fine determination of distance between the mobile craft and beacon. An antenna 30 couples energy over lines 31 to the azimuth determining portion 32 of the mobile craft receiver and over line 33 to the coarse distance determining portion 34 of the navigation receiver and over line 35 to the fine distance determining portion 36 of the receiver. The four cycle emission or the pulse modulated CW signals from the beacon transmitter 1 shown in Fig. 1 and illustrated in Fig. 2, curve A are received and detected by the R-F receiver 37 as bearing signals of different amplitude and a synchronizing signal as for example illustrated in Fig. 2, curve F. The output of the R-F receiver 37 is coupled to a synchronizing signal detector 38 whose output synchronizes a switch 39 which distributes each of the bearing signals "A," "B" and "C" detected in the bearing signal detector 41 to the proper portion of azimuth the indicator circuitry 40. Thus, in one embodiment of the receiver a three phase resolver may be energized so that each of the three field windings is excited by a different bearing signal "A," "B" or "C" emitted by the beacon. The three signals properly distributed to the appropriate windings of the resolver responsive to the synchronizing signal causes the resultant magnetic field within the resolver to have essentially the same angular displacement with respect to the three field windings as the receiving location has to the beacon site. Further explanation of the operation of the azimuth portion of the Navarho system may be obtained by referring to said U.S. Patent No. 2,541,040 or to the above-mentioned application Serial No. 382,934 or its continuation in part Serial No. 759,513. In regards to said application it should be pointed out that although the system therein described utilizes a silent interval as a synchronizing gap, it can be modified to use a synchronizing signal comprising an offset or double frequency transmission as described in this application.

The distance measuring portion of the Navarho system herein described is dependent upon the knowledge that the relative phase between a radio wave measured at the transmitting antenna site and measured some distance from the antenna is a function of the distance between the antenna and the measuring point. In order to measure this phase difference accurately, the receiving portion of this equipment requires a mobile frequency standard of extreme accuracy and a phase stable ground transmitter. If the transmitting frequency is closely maintained and if the initial phase relationship between the mobile craft and transmitting station is established, then it is obvious that any change in phase is proportional to the distance traveled by the mobile craft provided that the reference phase at the mobile craft remains stable. Because it is desirable to utilize a frequency of approximately 100 kilocycles, there is a distance ambiguity approximately every 1.6 nautical miles, the approximate wavelength of the transmitted carrier wave. In order to resolve this ambiguity a second frequency $f_2$ is transmitted and the beat frequency between $f_1$ and $f_2$ is also utilized to measure distance and frequency. Frequency $f_2$ can be separated from the carrier frequency $f_1$ by approximately 200 cycles. Thus, as this second carrier $f_2$ displaced by approximately 200 c.p.s. is transmitted simultaneously with the basic carrier $f_1$ it causes a 200 cycle beat frequency wave to be detected at the receiver and this beat frequency signal compared with a locally generated phase stable signal of the same frequency provides a coarse distance measuring signal while the basic frequency signal $f_1$ compared with a locally generated phase stable signal close to the same frequency provides the fine distance measuring signal. Since the 200 cycle signal has an ambiguity approximately every 820 nautical miles, this is not serious since an operator of a mobile craft is usually able to determine his location within 800 miles and the fine distance measuring system can be utilized to accurately locate the distance of the mobile craft to the ground beacon. The use of the pulsed transmission at relatively low cycling rates enables the Navarho beacon to operate over a narrow bandwidth and in addition the intermediate frequency amplifier in the mobile craft receiver can be designed to have an extremely narrow pass band, and thus this system is able to operate through great amounts of precipitation, static and noise.

Referring to the coarse distance measuring system 34 shown in Fig. 4, it comprises a modulator 42 whose output is coupled to a receiver head 43. The output of the receiver head 43 is coupled to an intermediate frequency (I.-F.) amplifier 44 and then to a signal detector 45 where the beat frequency of 200 cycles per second between the transmitted frequencies $f_1$ and $f_2$ is detected and coupled to a beat frequency amplifier 46 whose output comprises one input to a phase detector or comparator circuit 47. A 200 cycle local oscillator source 48 of extremely stable characteristics is coupled through a phase shifter 49 to form the other input to the phase detector 47. The error signal output of the phase detector 47 is coupled through a servo amplifier 50 to control motor 51, the output of which controls the operation of the phase shifter 49, in order to shift the phase of the signal from the local source 48 to cause the error signal output of the phase detector 47 to be zero. The rotation of the phase shifter 49 to reduce the error signal of the phase detector 47 to zero is an indication of the relative phase difference between the reference signal from source 48 and the phase of the received beat frequency signal developed from the Navarho transmissions, and this variation of the phase shifter is indicated by the pointer of a calibrated distance indicator 52 operated by the motor 51 in conjunction with the variation in phase shifter 49 coupled through switch 53.

In order to achieve the desired degree of accuracy to coarse distance measuring system 34 includes means to compensate for errors due to variation in phase shift of the signal coupled through the R-F, I.-F. and other circuitry of the receiver. At periodic intervals switch 54 has its armature 55 connected to the lower or test terminal 56 which couples a 200 cycle signal into the modulator 42 where it modulates the received signal frequency $f_1$. At the same time switch 53 has its armature 57 coupled to the left position or contact 58 to cause the output of motor 51 to rotate the dial of indicator 52 instead of the pointer. Any variation in the over-all phase shift of the receiver system for coarse distance measurement is translated into a mechanical reset of the dial of indicator 52 to compensate for the change.

Still referring to Fig. 4, the fine distance measuring system 36 of the receiver portion of the Navarho aerial navigation system is therein shown to comprise an extremely stable local source 60 of signals close to frequency $f_1$, for example, close to 100 kc. The received signal at frequency $f_1$ transmitted by the Navarho beacon is detected at the receiver head 61 which couples the output to a mixer 62 where it is mixed with the output of the extremely stable local oscillator source 60, such as a crystal oscillator, to produce a beat frequency which is coupled to an amplifier 63. The output of local oscillator 60 is divided in circuit 64 to produce a signal at the same frequency as the output of mixer 62 and it is then coupled through phase shifter 65 to form one input of phase detector 66, the other input to phase detector 66 being coupled from amplifier 63. The output of the phase detector 66 is fed to the servo amplifier 67 which causes the motor 68 to vary the phase shifter 65 until the output of phase detector 66 is zero. Thus any phase difference that detector 66 observes tends to zero itself through the servo system. The rotation of motor 68 is a measure of the phase shift of the incoming signal compared to the phase of the local source 60. The mechanical output of motor 68 is also coupled to the mileage indicator 69. Since one complete rotation of motor 68 equals a phase shift of 360° and only approximately 1.62 nautical miles a counter 70 is also driven by the motor output to indicate the accumulated complete 360° phase shifts or motor rotations.

Because the pilot knows his range only by the reading accumulated on counter 70 (except for the small distances shown on the mileage indicator 69) failure of the system results in an error which can only be rectified by dead reckoning. To this end, two safety devices are incorporated. An alarm indicator 71 immediately notifies the operator when the incoming signal has failed, and a timer 72 operated from the alarm signal stops running. The amount of time difference between clock 72 and a standard clock (which may be operated directly from the local oscillator 60 or, for greater reliability, it may be a regular chronograph) indicates the time during which the counter dial 69 was not accumulating a reading, and the latter may thereby be corrected within the error of dead reckoning.

Referring to Fig. 5, an alternate embodiment of a Navarho beacon transmitting system for use in the navigation system herein described is shown to comprise two sources of radio-frequency energy, illustrated as transmitters 73 and 74 operating at frequencies $f_1$ and $f_2$, respectively. The output of each of the transmitters 73 and 74 is coupled through switching circuitry 75 which in accordance with the Navarho transmission cycle above described, couples energy to the three antennas 76, 77 and 78. A centrally located antenna 79 is provided and during the synchronizing transmission interval energy is coupled to antenna 79 from both transmitters $f_1$ and $f_2$ in order to transmit synchronizing signal energy omnidirectionally. Of course as previously explained energy at frequency $f_1$ is coupled to the antennas cophasally in pairs in accordance with the basic Navarho transmission cycle to cause the transmission of the bearing signals.

While we have described above the principles of our invention in connection with specific apparatus and modifications thereof, it is to be clearly understood that this description is made only by way of example and not as a limitation to the scope of our invention as set forth in the objects thereof and in the accompanying claims. For example it is obvious that the receiver shown in Fig. 4 could be simplified by combining certain of functions performed by a plurality of blocks into a single block or for example other transmission beacons could be designed to transmit the Navarho information signals. Since many such changes could be made in the above construction and many apparently widely different embodiments of this invention could be made without departure from the scope thereof, it is intended that all matter contained in the above description or shown in the accompanying drawings shall be interpreted as illustrative and not in a limiting sense.

We claim:

1. A radio navigation system comprising a transmitter having means for cyclically and successively transmitting a plurality of signals including a plurality of differently directed radiation pattern bearing signals and a synchronizing signal at a given frequency and phase, and a receiver for receiving said signals and including bearing indication means responsive to the bearing signals for giving a direction indication, means for separating said synchronizing signals, means for applying said separated synchronizing signals to synchronize said bearing indication means, a source of reference signals of fixed frequency and phase, means for deriving from said synchronizing signals, signals of the same frequency as said reference signals but varying in phase in accordance with variations in the phase of said synchronizing signals, means for comparing the phase of said reference signals and said derived synchronizing signals to produce a comparison signal, and means controlled by the output of said comparison means and responsive to said comparison signal for producing a distance indication.

2. A radio navigation system comprising a transmitter having means for cyclically and successively transmitting a plurality of signals including a plurality of differently directed radiation pattern bearing signals and a synchronizing signal at a given frequency and phase, and a receiver for receiving said signals and including bearing indication means responsive to the bearing signals for giving a direction indication, means for separating said synchronizing signals, means for applying said separated synchronizing signals to synchronize said bearing indication means, a source of reference signals of fixed frequency and phase, means for deriving from said synchronizing signals, signals of the same frequency as said reference signals but varying in phase in accordance with variations in the phase of said synchronizing signals, means for comparing the phase of said reference signals and said derived synchronizing signals to produce a comparison signal, counting means for recording differences in phase greater than 360° between said reference signals and said derived synchronizing signals and means controlled by the output of said comparison means and responsive to said comparison signal for producing a distance indication.

3. A radio navigation system comprising a transmitter having means for cyclically and successively transmitting a plurality of signals including a plurality of differently directed radiation pattern bearing signals and a first synchronizing signal at a given frequency and phase, and transmitting during the transmission of said synchronizing signal a second synchronizing signal at a frequency different from said given frequency, and a receiver for receiving said signals and including bearing indication means responsive to the bearing signals for giving a direction indication, means for separating said synchronizing signals from said bearing signals, means for applying said separated synchronizing signals to synchronize said bearing indication means, means for detecting the beat frequency signal between said first and second synchronizing signals, a source of reference signals of the same frequency as said beat signal but fixed in phase, means for comparing the phase of said reference signals and said beat frequency signal to produce a comparison signal, and means controlled by the output of said comparison means and responsive to said comparison signal for producing a distance indication.

4. A radio navigation system comprising a transmitter having means for cyclically and successively transmitting a plurality of signals including a plurality of differently directed radiation pattern bearing signals and a first synchronizing signal at a given frequency and phase, and transmitting during the transmission of said synchronizing signal a second synchronizing signal at a frequency different from said given frequency, and a receiver for receiving said signals and including bearing indication means responsive to the bearing signals for giving a direction indication, means for separating said synchronizing signals from said bearing signals, means for applying said separated synchronizing signals to synchronize said bearing indication means, means for detecting the beat frequency signal between said first and second synchronizing signals, a first source of reference signals at said beat frequency, means for comparing the phase of said reference signals from said first source thereof and said detected beat frequency signal, and means controlled by the output of said comparison means and responsive to said comparison signal for producing a distance indication, a second source of reference signals at said given frequency and phase, means for comparing the phase of said reference signals from said second source thereof and said first synchronizing signal, counting means for recording differences in phase greater than 360° between said reference signal and said separated first synchronizing signal, means controlled by the output of said comparison means and responsive to said comparison signals for producing a fine distance indication.

5. In a radio navigation system, a radio beacon comprising means for cyclically and successively transmitting a plurality of signals including a plurality of differently directed radiation pattern bearing signals and a first synchronizing signal at a given frequency and phase, and means for transmitting during the transmission of each said sychronizing signal a second synchronizing signal at a frequency different from said given frequency.

6. A radio beacon system comprising at least two sources of radio energy each at a different frequency, at least three antennas spaced each from the others to transmit overlapping directive radiation patterns, means for energizing selected of said antennas cyclically in pairs from one of said sources of radio-frequency energy and means for transmitting omnidirectionally signals on at least two of said frequencies intermediate of said cycles.

7. In a radio navigation system cyclically and successively transmitting a plurality of signals including a plurality of differently directed radiation pattern bearing signals and a synchronizing signal at a given frequency and phase, a receiver for receiving said signals comprising bearing indication means responsive to the bearing signals for giving a direction indication, means for separating said synchronizing signals, means for applying said separated synchronizing signals to synchronize said bearing indication means, a source of reference signals of predetermined frequency and phase, means for deriving from said synchronizing signals, signals of the same frequency as said reference signals but varying in phase in accordance with variations in the phase of said synchronizing signals means for comparing the phase of said reference signals and said derived synchronizing signals, and means controlled by the output of said comparison means and responsive to said comparison signal for producing a distance indication.

8. In a radio navigation system cyclically and successively transmitting at a given frequency, a plurality of signals including a plurality of differently directed radiation pattern bearing signals and a synchronizing signal, a receiver for receiving said signals comprising bearing indication means responsive to the bearing signals for giving a direction indication, means for separating said synchronizing signals, means for applying said separated synchronizing signals to synchronize said bearing indication means, a source of reference signals at a predetermined frequency and phase, means for comparing the phase of said reference signals and said transmissions at said given frequency including means for deriving from said transmissions at said given frequency, signals of the same frequency as said reference signals but varying in phase in accordance with variations in the phase of said transmissions, and means controlled by the output of said comparison means and responsive to said comparison signal for producing a distance indication.

9. In a radio navigation system cyclically and successively transmitting a plurality of signals including a plurality of differently directed radiation pattern bearing signals and a synchronizing signal at a given frequency and phase, a receiver for receiving said signals comprising bearing indication means responsive to the bearing signals for giving a direction indication, means for separating said synchronizing signals, means for applying said separated synchronizing signals to synchronize said bearing indication means, a source of reference signals at a predetermined frequency and phase, means for comparing the phase of said reference signals and said separated synchronizing signals including means for deriving from said separated synchronizing signals, signals of the same frequency as said reference signals but varying in phase in accordance with variations in the phase of said synchronizing signals, counting means for recording differences in phase greater than 360° between said reference signal and said separated synchronizing signals and means controlled by the output of said comparison means and responsive to said comparison signals for producing a distance indication.

10. In a radio navigation system cyclically and successively transmitting a plurality of signals including a plurality of differently directed radiation pattern bearing signals and a synchronizing signal at a given frequency and phase, a receiver for receiving said signals comprising a plurality of signals including a plurality of differently directed radiation pattern bearing signals and a first synchronizing signal at a given frequency and phase, and transmitting during the transmission of each said synchronizing signal a second synchronizing signal at a frequency different from said given frequency, a receiver for receiving said signals comprising bearing indication means responsive to the bearing signals for giving a direction indication, means for separating said synchrosizing signals from said bearing signals, means for applying said separated synchronizing signals to synchronize said bearing indication means, means for detecting the beat frequency signal between said first and second synchronizing signals, a source of reference signals at the same frequency as said beat frequency but fixed in phase, means for comparing the phase of said reference signals and said beat frequency signal, and means controlled by the output of said comparison means and responsive to said comparison signal for producing a distance indication.

References Cited in the file of this patent

UNITED STATES PATENTS

| | | |
|---|---|---|
| 2,541,040 | Colin | Feb. 13, 1951 |
| 2,541,627 | Williams | Feb. 13, 1951 |